United States Patent
Tavakoli Nia et al.

(10) Patent No.: US 8,516,610 B1
(45) Date of Patent: Aug. 20, 2013

(54) HIGH-FREQUENCY RHEOLOGY SYSTEM

(75) Inventors: Hadi Tavakoli Nia, Cambridge, MA (US); Iman Soltani Bozchalooi, Cambridge, MA (US); Kamal Youcef-Toumi, Cambridge, MA (US); Christine Ortiz, Melrose, MA (US); Alan J. Grodzinsky, Lexington, MA (US); Eliot Frank, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 13/423,317

(22) Filed: Mar. 19, 2012

(51) Int. Cl.
*H01J 37/252* (2006.01)

(52) U.S. Cl.
USPC .................................. 850/1; 850/5; 850/33

(58) Field of Classification Search
USPC .................................................. 850/1, 5, 33
See application file for complete search history.

(56) References Cited

U.S. PATENT DOCUMENTS

| 5,371,365 A * | 12/1994 | Watanabe et al. ................. 850/1 |
| 5,426,302 A * | 6/1995 | Marchman et al. ............... 850/6 |
| 6,215,121 B1 * | 4/2001 | Fujihira et al. .................... 850/1 |
| 6,614,227 B2 * | 9/2003 | Ookubo ........................ 324/316 |
| 2006/0027739 A1 * | 2/2006 | Warren et al. ................. 250/234 |
| 2006/0283240 A1 * | 12/2006 | Struckmeier et al. ........... 73/105 |
| 2011/0041223 A1 * | 2/2011 | Jesse et al. ........................ 850/5 |
| 2011/0167524 A1 * | 7/2011 | Hu et al. ........................... 850/1 |
| 2011/0167525 A1 * | 7/2011 | Humphris ....................... 850/33 |

OTHER PUBLICATIONS

C, Nia, HT, et al, Biophysical Journal 2011, 101, (9), 2304-2313.

* cited by examiner

*Primary Examiner* — Michael Logie
(74) *Attorney, Agent, or Firm* — Sam Pasternack; MIT Technology Licensing Office

(57) ABSTRACT

Rheology system. The system includes a first piezoelectric actuator assembly for providing microscale displacement of a sample and a second piezoelectric actuator assembly for oscillating the sample at a nano/micro scale displacement in a selected frequency range extended significantly as compared to the frequency range available on the commercial AFMs. A preferred sample is cartilage and the disclosed system can distinguish between normal cartilage and GAG-depleted cartilage.

7 Claims, 2 Drawing Sheets

HIGH-FREQUENCY RHEOLOGY SYSTEM

This invention was made with government support under Grant Nos. DMR0819762 and CMMI0758651 awarded by the National Science Foundation and under Grant No. R01 AR033236 awarded by the National Institutes of Health. The government has certain rights in this invention.

BACKGROUND OF THE INVENTION

This invention relates to determining the dynamic modulus of materials and more particularly to a high-frequency dynamic indentation system for use with a commercial/custom made atomic force microscope (AFM) to extend analysis to higher frequencies.

Atomic force microscopes often include a piezoelectric actuator for dynamic indentation experiments on materials with time (frequency)-dependent mechanical properties such as cartilage to determine its dynamic modulus. For the case of cartilage, the frequency-dependent properties of the tissue can be used to detect GAG (Glycosamicoglycan)-depletion, which represents early stage arthritis.

The piezoelectric actuator in an AFM is not capable of high-frequency operation so that the complex dynamic modulus of cartilage, for example, cannot be sufficiently characterized. This information is needed in order to draw secondary conclusions about the sample under investigation, for example, to determine whether the cartilage is normal or GAG-depleted. The latter in this case would be an indication of the onset of arthritis.

It is therefore an object of the present invention to provide a secondary sample oscillation system to be used in conjunction with a commercial AFM that operates in a sufficiently high frequency range to enable proper characterization of the mechanical properties of the sample under investigation, for example, to distinguish normal cartilage from GAG-depleted cartilage. Of course, the system disclosed herein can be used with materials other than cartilage.

SUMMARY OF THE INVENTION

In one aspect, the rheology system of the invention includes a first piezoelectric actuator assembly for providing microscale displacement of a sample. A second piezoelectric actuator assembly is provided for oscillating the sample at a nano/micro scale displacement in a selected frequency range. It is preferred that the first piezoelectric actuator be part of an atomic force microscope (AFM). In a preferred embodiment, the microscale displacement provided by the first piezoelectric actuator is a ramp and hold displacement. The first piezoelectric actuator provides displacement in the range of approximately 2-4 μm.

In another preferred embodiment, the second piezoelectric actuator assembly includes a beam for supporting the sample and a substrate to which the beam is affixed in a spaced-apart relation. A piezoelectric actuator is positioned between the substrate and the beam to cause the beam to oscillate at a selected frequency and displacement upon piezoelectric actuator activation. It is preferred that the second piezoelectric actuator be pre-loaded against the beam in order to make the amplitude of the secondary piezo oscillation independent of the load, i.e., the sample weight. A suitable selected frequency is in the range of 1 l-Hz to 200 kHz. A suitable displacement effected by the second piezoelectric actuator is in the range of 1 to 50 nm. A suitable material for beam construction is carbon fiber or any other material with a high ratio of stiffness to density. It is also preferred that a mica layer be disposed between the beam and the sample to electrically isolate the secondary piezo.

DESCRIPTION OF THE PREFERRED EMBODIMENT

Figure 1:
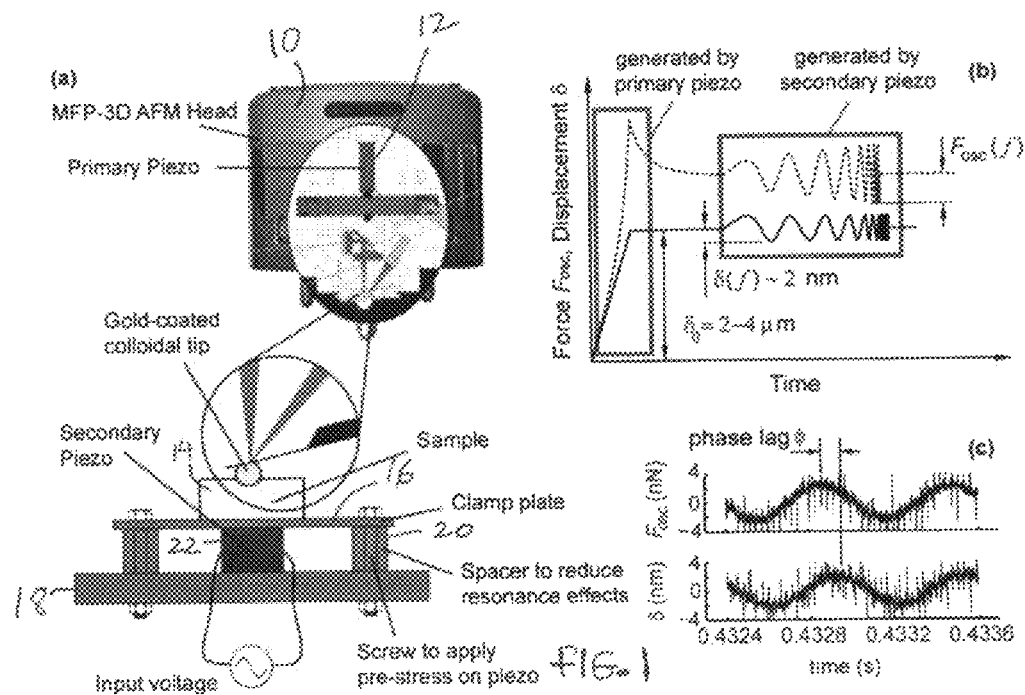
FIG. 1a is a partially exploded view of an atomic force microscope along with the secondary piezoelectric actuator disclosed herein.
FIG. 1b is a graph of force and displacement against time showing the waveform generated by the primary piezoelectric actuator and the secondary piezoelectric actuator assembly.
FIG. 1c includes graphs of a typically applied displacement and measured force curves versus time featuring a phase lag between the force and displacement.

In order to measure the dynamic modulus of cartilage at high frequencies (200 Hz<f<200 kHz) we developed the novel setup shown in FIG. 1. With reference to FIG. 1a, an AFM head 10 includes a primary piezoelectric actuator 12. As shown in the exploded portion of FIG. 1a, a sample 14 is disposed on a beam 16 that is clamped in a spaced-apart way to a substrate 18. The beam 16 and the substrate 18 are separated by spacers 20 to reduce resonance effects. A second piezoelectric actuator 22 is disposed between the beam 16 and the substrate 18. It is preferred that the second piezoelectric actuator assembly 22 be pre-loaded between the beam 16 and the substrate 18 so that the displacement of the beam 16 and sample 14 is load-independent. It is preferred that the second actuator assembly 22 provide a displacement of approximately 1 nm on the sample 14.

The AFM head 10 may be a commercial atomic force microscope such as the MFP-3D unit available from Asylum Research of Santa Barbara, Calif. The second piezoelectric actuator 22 is small, on the order of 2×2×2 mm in order to maximize its resonance frequency. It is preferred that the beam 16 material be carbon fiber in order to remove the resonances caused by the beam as the carbon fiber beam will have low weight and high stiffness. It is also preferred that the sample 14 be placed on a mica surface (not shown) which is securely glued to the carbon fiber beam 16. The mica surface would serve as an electrical insulator between the beam and the secondary piezo. The secondary piezoelectric actuator 22 is activated by an oscillatory frequency sweep signal (DC=5 volts, Amp=0.2 volts)/random binary sequence or other signals of interest for system identification which is generated in a function generator and as implemented in the experimental setup presented herein and can be based on LabView from the National Instrument Company of Austin, Tex. The generated frequency sweep signal/Random Binary Sequence was amplified by a custom-made amplifier in order to supply the required power at high frequencies.

As shown in FIG. 1b, the displacement profile is comprised of two parts: first, the approach is performed and a ramp with indentation depth $\delta_0=2$ μm is applied by the primary piezoelectric actuator 12 of the MFP-3D AFM. The ramp is followed by a hold to relax the applied stress and is superimposed with an oscillatory displacement signal with an amplitude of δ approximately 1 nm that is applied by the secondary piezoelectric actuator 22. FIG. 1c shows displacement and frequency as a function of time and illustrates a phase lag between force and displacement.

Figure 2:
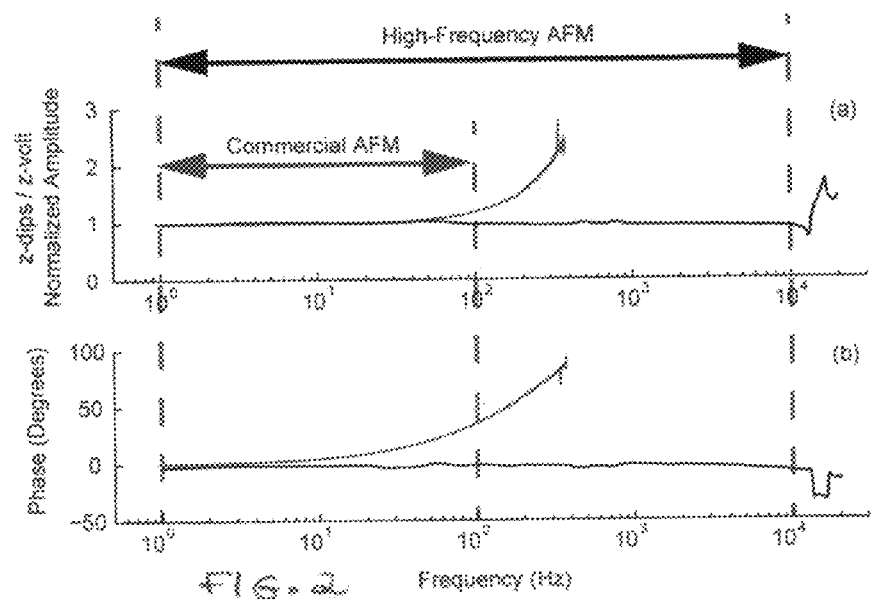
FIG. 2a shows the ratio of the piezo displacement to the applied voltage for both a commercial AFM (Bruker PicoForce) and the secondary piezoelectric actuator disclosed here.
FIG. 2b shows the phase lag between the piezo displacement and the applied voltage for both a commercial AFM (Bruker PicoForce) and the secondary piezoelectric actuator disclosed here.

As shown in FIG. 2, the high-frequency system disclosed here is tested and compared to the commercial AFM. This comparison is performed on a mica sample representing a hard surface. With a mica sample one should ideally observe a constant piezo amplitude (FIG. 2a) and, phase (FIG. 2b) of the displacement over the desired frequency range, to be able to quantify the dynamic modulus of the desired sample. The commercial AFM is effective in the frequency range of 1 to 200 Hz (See, Nia, H. T.; Han, L.; Li, Y.; Ortiz, C.; Grodzinsky, A. Biophysical Journal 2011, 101, (9), 2304-2313.). The high-frequency system disclosed here is effective over the frequency range of 1 to 200 kHz, which shows 2 decades improvement compared to the commercial system.

Figure 3:
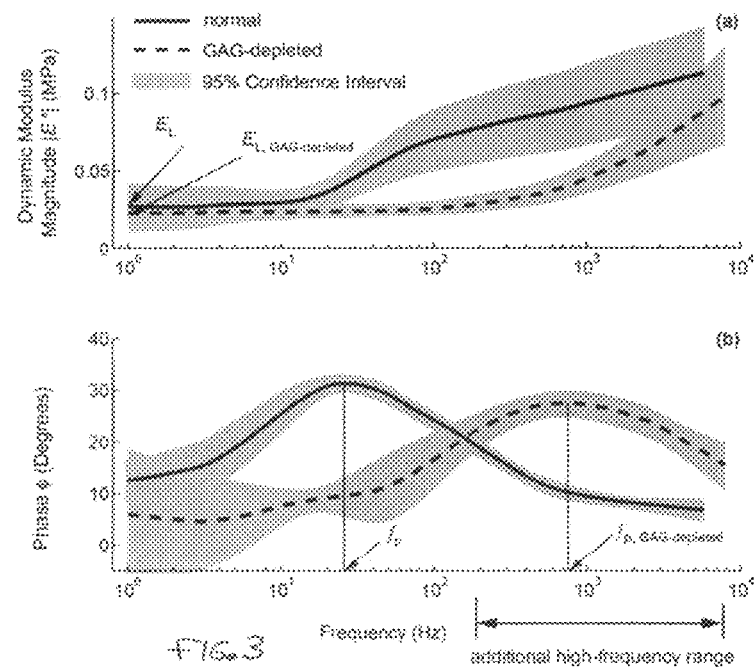
FIG. 3a is a graph of dynamic modulus magnitude versus frequency for normal and GAG-depleted cartilage.
FIG. 3b is a graph of phase against frequency for normal and GAG-depleted cartilage.

Utilizing the high-frequency system disclosed herein, we measured the phase and magnitude of the complex dynamic moduli of normal and GAG-depleted cartilage at the nanoscale deformation as shown in FIG. 3. This first investigation of cartilage nanomechanics at the wide range of frequencies in the range of 1 Hz to 8 kHz revealed important features in poroelasticity of cartilage and its connection to the major constituents of cartilage such as aggrecan and collagen networks. We observed that the phase lag plot in FIG. 3b features a peak similar to that observed on healthy cartilage. See, Nia, H.-T.; Han, L.; Li, Y.; Ortiz, C.; Grodzinsky, A. Biophysical Journal 2011, 101, (9), 2304-2313. Note that for the damaged cartilage the peak was shifted to a significantly higher frequency, hence making it unobservable in conventional AFM setups. The observation of this peak in the phase angle was possible only through this high-frequency setup coupled to the AFM which resulted in a frequency extension from 100 Hz to 8 kHz. The peak in phase shown in FIG. 3b along with the corresponding 120 ascending trend in the magnitude of the dynamic modulus as shown in FIG. 1a correspond to the linear poroelastic behavior of cartilage. We have previously shown that the characteristic frequency, $f_p$, the frequency at which the phase lag peaks, relates to the hydraulic permeability, k, stiffness H and the contact distance d as the following: $f_p = kH/d^2$. Utilizing the high-frequency test capability of the system disclosed herein, we observed that the characteristic frequency, $f_p$, an important feature of the poroelasticity of cartilage at the nanoscale, is a sensitive differentiator of GAG-depletion, much more effective than conventionally-used elasticity tests.

Figure 4:
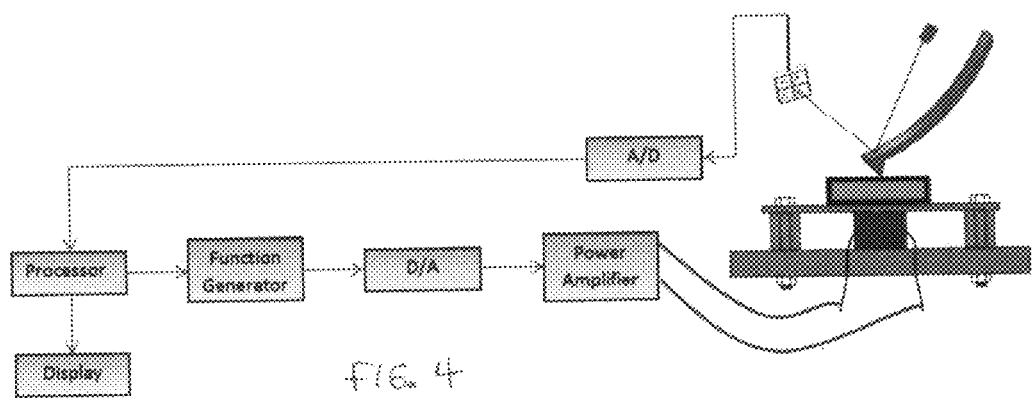
FIG. 4 is a flowchart of the preferred embodiment.

FIG. 4 is a flow chart illustrating operation of an embodiment of the invention.

The contents of the above cited reference is incorporated herein by reference in its entirety.

It is recognized that modifications and variations of the invention disclosed herein will be apparent to those of skill in the art and it is intended that all such modifications and variations be included within the scope of the appended claims.

What is claimed is:

1. A rheology system comprising:
   a first piezoelectric actuator assembly for providing microscale displacement of a sample; and
   a second piezoelectric actuator assembly for oscillating the sample at a nanoscale/microscale displacement in a selected frequency range wherein the second piezoelectric actuator assembly comprises:
   a beam for supporting the sample;
   a substrate to which the beam is affixed in a spaced-apart relation; and
   a piezoelectric actuator positioned between the substrate and the beam to cause the beam to oscillate at a selected frequency and displacement upon piezoelectric actuator actuation.

2. The system of claim 1 wherein the second piezoelectric actuator is pre-loaded against the beam.

3. The system of claim 1 wherein the selected frequency is in the range of 1 Hz to 200 kHz.

4. The system of claim 1 wherein the nanoscale displacement is approximately 1 nm.

5. The system of claim 1 wherein the beam is made of carbon fiber.

6. The system of claim 1 further including a mica layer between the beam and the sample.

7. The system of claim 1 wherein the sample is cartilage.

* * * * *